May 26, 1931. A. W. BENNIS 1,807,502
CHAIN GRATE
Filed Jan. 19, 1925 3 Sheets-Sheet 2
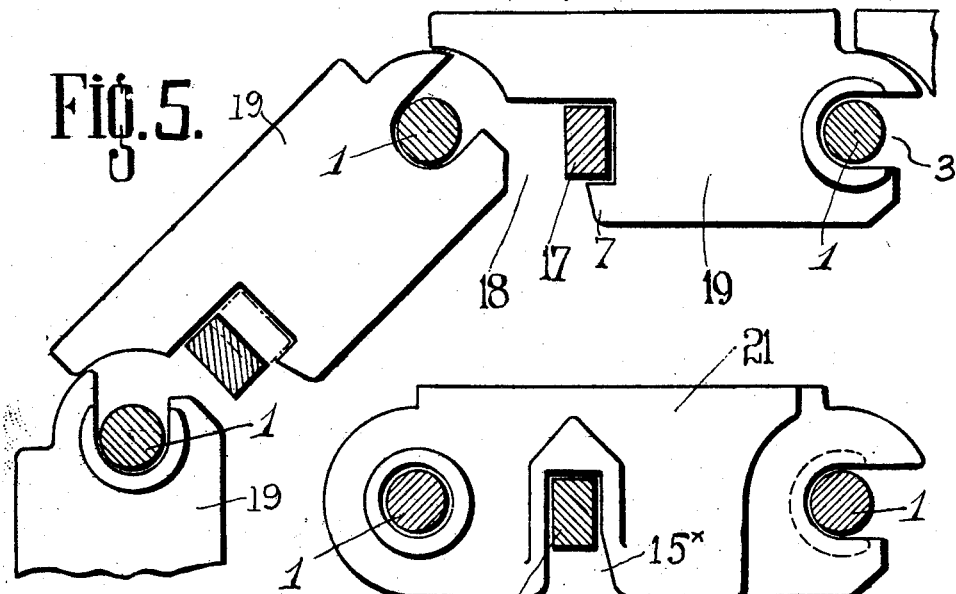
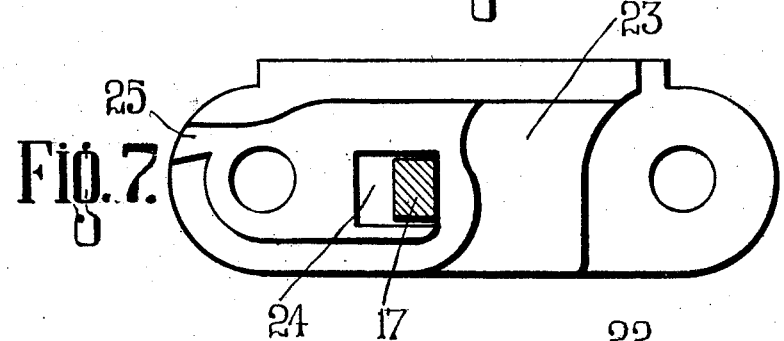
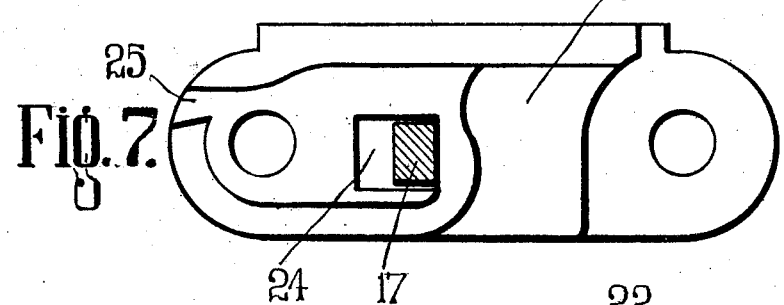
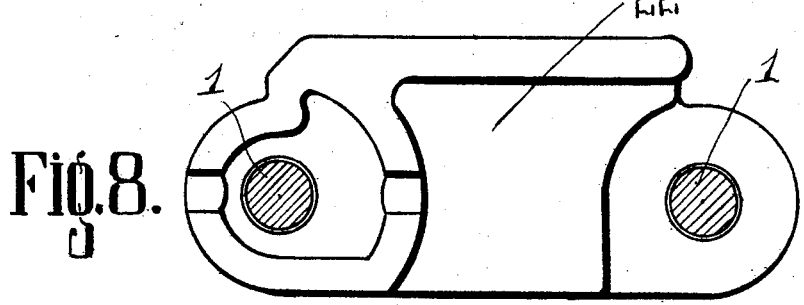

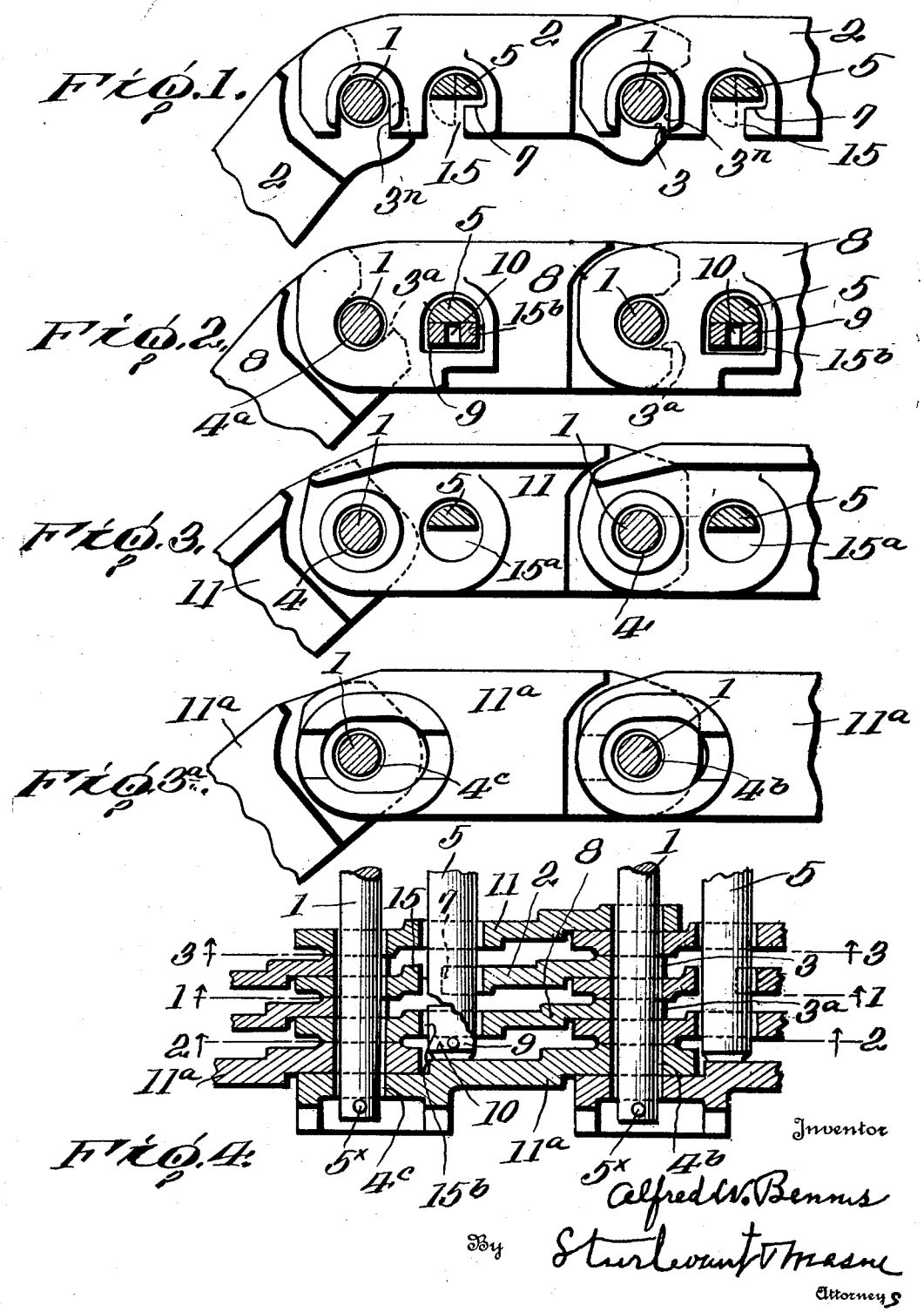

May 26, 1931.  A. W. BENNIS  1,807,502
CHAIN GRATE
Filed Jan. 19, 1925    3 Sheets-Sheet 3
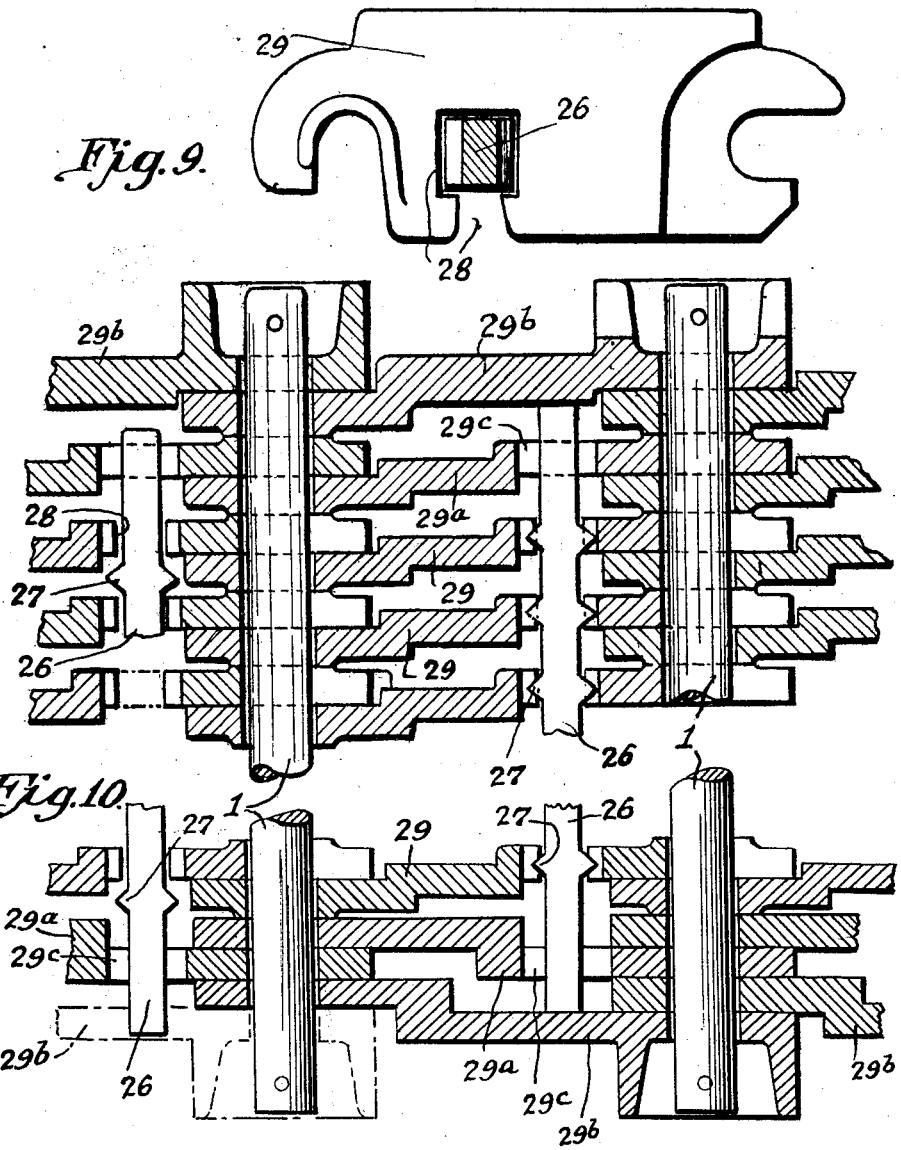

Patented May 26, 1931

1,807,502

UNITED STATES PATENT OFFICE

ALFRED WILLIAM BENNIS, OF BOLTON, ENGLAND

CHAIN GRATE

Application filed January 19, 1925, Serial No. 3,404, and in Great Britain January 21, 1924.

The present invention relates to improvements in chain grates for furnaces or the like and more particularly to that type where detachable and renewable grate bars or fillers are provided in the grate.

According to the present invention the detachable grate fillers forming a part of the operative chain grate are locked together by means of a locking bar or element which operates by a motion which is limited substantially to the dimension in width of a single filler. It will be understood that in the following specification and claims by the word "filler" is intended a member to be inserted in a skeleton grate for completing the upper and fuel bearing surface thereof.

This limited motion may be longitudinally of the locking bar, laterally of the same, or a rotary motion about the axis of the bar.

The invention is more particularly described with reference to the accompanying drawings, in which:

Figure 1 is a view of one form of the invention in which a number of intermediate removable grate bars or fillers are connected together, with a locking bar shown in full lines in its locked position, and in dotted lines in its position for releasing the the grate bars or fillers for the removal of the latter.

Fig. 2 is a view of a form of end locking plate, with a locking bar, according to the present invention, and a removable locking wedge block therefor.

Fig. 3 is a view of a pair of intermediate driving links connected together and showing the locking bar.

Fig. 3a is a similar view of an end driving plate.

Fig. 4 is a view in horizontal section of a grate assembly from the fillers, plates and links of Figs. 1, 2 and 3, all placed in juxtaposition with the locking bar and wedge block to hold the removable fillers in position.

Fig. 5 is a similar side elevation of a further modified form of intermediate renewable grate bars or fillers, with a locking bar of further modified form, i. e., a locking bar suitable for lateral displacement to effect the locking and unlocking of the fillers.

Fig. 6 shows a locking or clamping link suitable for a locking bar according to Fig. 5.

Fig. 7 shows an intermediate driving link suitable for a locking bar according to Fig. 5.

Fig. 8 is a side elevation of a further modification of a side driving link being adapted for employment with the filler of Fig. 5, the normal direction of motion being from left toward right.

Fig. 9 is a view of another modified form of intermediate renewable grate bar or filler together with a further modified form of locking bar, which is suitable for locking and unlocking the fillers by a slight longitudinal displacement.

Fig. 10 is a horizontal section through a number of intermediate renewable grate bars or fillers and a side driving link, and the locking bar of Fig. 9.

According to this invention, a chain grate is prepared of a number of grate bars comprising driving links which are connected together by means of transverse pivot rods over which may be placed in the gaps between said driving links a plurality of intermediate removable fillers. These removable fillers are held in position upon the pivotal rods by means of locking bars which are associated with locking grate bars or plates preferably located adjacent the ends of the bars so that they are maintained in locking relation with the intermediate removable fillers. In such a construction, a skeleton grate is formed of rows across the furnace comprising the driving links, and locking plates and pivotal rods, the spaces between which are filled by the intermediate removable grate bars or fillers to complete the grate surface.

In the form of construction shown in Figs. 1, 2, 3, 3a and 4 of the drawings, the intermediate removable grate fillers 2 in Fig. 1 are provided at their ends with end-opening notches 3 and bottom opening notches 3n to engage with the pivotal rods 1. The intermediate driving links 11 (Fig. 3) are formed similarly to the intermediate removable fillers 2, but are provided with apertures 4 instead of the notches 3, 3a so that they embrace the pivotal rods 1 and serve therewith to form a skeleton for the grate for the positive transmission of power along the grate, whereby it is enabled to travel.

The locking bar 5 is of semi-circular section and is received for rotation in the apertures 15a of the driving links 11. The removable fillers 2 have the notches 15 at their bottoms terminating at the central portions of the link in a widened section having a circular arc at the top and a ledge 7 associated therewith, as shown in Fig. 1, so that when the locking bar 5 has its diametral plane horizontal, this locking bar engages the ledge 7 of each of the removable fillers 2 and holds them in relative position to each other and to the driving links 11, so that they cannot be moved upwardly and detached from the pivotal rods 1, nor drop away in the inverted position when the grate chain is on its return or bottom flight.

The locking plates 8 (Fig. 2) are disposed in parallelism to the fillers 2 and links 11 at suitable intervals, and preferably adjacent the sides of the grate. These locking plates are preferably formed with apertures 4a to receive a pivotal rod 1, adjacent one end of each of these locking plates 8, and at the other end with notches 3a for engagement upon another pivotal rod 1. Intermediate their lengths they are each provided with an aperture 15b having a semi-circular arch at the top, with a rectangular bottom section. The locking bar 5 is provided at the point where it is to lie in the locking plate 8 when the grate is filled and locked, with the locking wedges 9, which with the semi-circular bar 5 fill the apertures 15b, and prevent a rotation of the bar about its axis. Hole 10 in the wedge 9 facilitates the engagement of the wedge by a hook, to enable it to be drawn endwise.

In assembling a grate from such links and fillers, a pivot rod 1 such as the right-hand rod in Figs. 1 and 3, is placed in position, passing through the intermediate driving links 11 (Fig. 3) and end driving links 11a (Fig. 3a), which are preferably located intermediate the length and at the ends of the pivotal rod. A plurality of removable fillers 2 are then placed with the open notches 3 upon the pivotal rod 1 shown, and interspersed among them a number of locking plates 8.

A further pivotal rod is then run through the apertures of the driving link 11 and of the locking plate 8; the removable fillers 2 are now rocked downward until their notches 3a are received upon this second pivotal rod 1. In assembling the links 11 and plates 8, a locking bar 5 is slid into their apertures, and for the moment is left with the diametral plane in a vertical position as shown in dotted lines in Fig. 1. The removable fillers 2 are now rocked downward and over this locking bar 5. The locking bar 5 is now rotated about its axis into the position shown in full lines in Figs. 1 and 3. The wedges 9 are then engaged within the lower portion of the aperture 15b of the locking link 8, and the locking bar 5 is then held in such position. The proper end driving links 11a (Fig. 3a) are then slipped into into position to prevent endwise movement of the locking bar 5; these end driving links 11a engaging over the pivotal rods 1 by their holes 4c and being retained, respectively, by the pins 5x. It will be seen that under such conditions the links and fillers are positively locked against removal.

By this means each intermediate renewable or detachable grate bar or filler may be rapidly detached or attached upon its pivotal pins whenever it is desired to remove a link or filler or replace a broken link or filler.

All the grate bars or fillers which have thus been described are for use with locking bars 5 having a rotary movement about their own axes to effect unlocking.

In the construction of grate bars and fillers the various members of which for one type of grate are shown in Figs. 5 to 8, a lateral displacement of the locking bar is used to hold the fillers against removal when in one position, and to release them so that they may be individually removed when in the other position. A locking bar 17 is here provided of rectangular cross section to engage in a notch 18 (Fig. 5) of the intermediate renewable grate bars or fillers 19 which lie side by side in a row across the grate. In such a construction only one pivotal rod 1 is used to engage with each intermediate renewable filler 19.

Here again a number of such intermediate removable fillers are positioned side by side along a pivot rod 1, and engage it by the notches 3. At each end of such a row is a side locking plate 21, Fig. 6, of the grate; and next to it at the end of the bar is a driving link or bar 22, Fig. 8. The side locking plates 21 each have a notch 15x with substantially straight sides opening at its bottom to receive and hold the locking bar 17 from movement away from the pivot rod 1 associated with the respective links. Intermediate driving links 23 may be positioned along the bar intersperced in the row of removable fillers 19; each of which has an aperture 24 of sufficient width to allow the displacement of the bar 17 bodily in a direction at a right angle to its length to a position parallel to its indicated position.

To assemble such a system, a pivot rod and a locking bar 17 are passed through the driving links 23 to form a skeleton. Intermediate removable fillers 19 are then slipped onto the pivot rod 1 by their end notches 3: the locking bar 17 is held in the left hand position shown in full lines at the left of Fig. 5, and the fillers 19 are rocked downward onto this locking bar 17. Locking plates 18 are then placed upon the pivotal rod and over the locking bar 17. The locking bar 17 is then moved toward the right into the position shown in dotted line at the left and in full lines at the right of Fig. 5, to engage over the ledges 7 of the fillers 19, and a further pivotal rod is slipped through the intermediate driving links 23 and the locking plates 22, with the inclusion of further intermediate driving links for a new row. This establishes a fixed distance between the centers of the pivot rods 1, and hence between the locking bar 17 and both pivot rods, and the bar 17 is now held in position fixedly. Finally, the end driving links 22, Fig. 8, are placed in position to assure the bars 17 against endwise movement and to complete the structure.

A broken filler or link may be replaced after dismounting in a reverse manner.

Such intermediate driving links 23 are used in the case of wider types of grates and it is desirable in this case to be able to effect rapid displacement of the intermediate renewable fillers 19 without the necessity of displacing the intermediate driving links. It is also preferred in this type of intermediate driving link not to notch the ends.

Grooves 25 may be formed at one or both ends or sides of the intermediate driving links 23 to allow a free exit for ash or dust having entered the interior of the links or fillers when the latter have passed round the driving sprocket.

In the further modified form of construction as shown in Figures 9 and 10, locking bars 26 are provided having alternate portions of different diameter. In the construction shown a number of lugs or teeth 27 are formed on the surface of the bar 26, which teeth 27 are adapted to be inserted in suitable notches 28 in an intermediate renewable filler 29. The openings to such notches 28 are of a diameter considerably less than that of the notches 28 themselves.

In such a type of grate, side driving links 29a are used and a pair of side locking plates 29b may also be used to keep the locking bar 26 in position, all fillers being held in position by the pivotal rods 1. When it is desired to move this bar into a position shown at the left hand side of Figure 9 to unlock the intermediate renewable fillers 29 the side locking plate 29b is first removed (dotted lines at left of Fig. 10) and the locking bar 26 then displaced longitudinally with a bodily endwise movement in the notches 28 and the holes 29c of the driving links 29a. The narrow portion of the locking bar 26 is then positioned in the notches 28 of each renewable filler 29 so that the fillers 29 can be raised out of the plane of the grate as the narrow passage of the notch 28 passes outside the locking bar. Such locking bar 26 therefore is of less diameter at its narrow portions than the width of the narrow throat to the notch.

I declare that what I claim is:

1. A furnace chain grate comprising grate bars including fillers having open notches and arranged in transverse rows and driving links, pivotal interconnecting means between said driving links and engaging in said open notches, and a separate and independent locking bar for engaging the grate bars of each row to secure said fillers upon said pivotal connections, said locking bar being adapted to secure the fillers in position or release them for removal by a bodily endwise movement of said locking bar by a distance less than the transverse width of one of said fillers, and means for holding said locking bar in securing position.

2. A furnace chain grate comprising grate bars arranged in rows transverse of the grate, pivot connections between said bars at their ends so that the bars of one row may pivot with respect to adjacent rows, certain of said bars being removable fillers and each having a notch in the bottom intermediate the ends thereof, each notch providing a ledge on the respective filler, a locking bar movable onto and off from said ledge, and means on others of said bars to lock said locking bar upon the ledges of a row of fillers.

3. A furnace chain grate comprising grate bars arranged in rows transverse of the grate, pivot connections between said bars at their ends so that the bars of one row may pivot with respect to those of adjacent rows, certain of said bars being removable fillers and having spaced bottom portions each having a notch at the bottom providing a ledge on the respective filler, locking devices to engage and disengage the ledges of the rows of fillers, and means on others of said grate bars to prevent bodily movement of said devices, each of said devices having means to engage said ledges of the respective fillers, said engaging means being disengageable from said ledges by a bodily movement for bringing said engaging means opposite the spaces between the bottom portions of said fillers.

4. A furnace chain grate comprising a plurality of parallel pivot rods extending transverse to the direction of movement of the grate, links for holding said pivot rods in spaced relationship, a plurality of fillers each having end and bottom notches engaging two of said rods so that successive transverse rows of fillers may rock with respect to each other and the individual fillers may be removed from the respective rods, individual transversely extending locking bars for the transverse rows of fillers, each said locking bar and the fillers having means for locking interengagement upon a bodily movement of said locking bar whereby the fillers are held against removal from said pivot rods, said links preventing movement of said locking bars when in locked position.

5. A furnace chain grate comprising a plurality of parallel pivot rods extending transverse to the direction of movement of the grate, means for holding said pivot rods in spaced relationship, a plurality of fillers each having notches engaging two adjacent pivot rods so that successive transverse rows of fillers may rock with respect to each other and the individual fillers may be removed from the respective rods, individual locking bars for each transverse row of fillers, each said bar and the respective fillers having interengaging means whereby the fillers are lock against removal, said interengaging means on each said bar being releasable from the respective fillers by a rotating movement of the respective locking bar about its axis, and locking means to hold the locking bars against such movement.

6. A furnace chain grate comprising a plurality of filler grate bars, each having a fuel supporting portion and a connecting portion joined to said fuel supporting portion, each said connecting portion having a first open notch at one end thereof and a second open notch providing a ledge, driving links having openings therein, pivotal interconnecting means passing through said openings and through said first notches whereby to form transverse rows of filler bars and links for the chain grate, a locking bar for each row having means thereon to engage the ledges of each filler bar of the respective row, a locking plate, and means for locking interengagement of said locking plate and said locking bar to prevent rotation of the latter, said means being adapted to be moved axially to free itself from the said plate whereupon the bar may be rotated to release said ledges, and means on said driving links to prevent said axial movement.

7. A furnace chain grate comprising end and intermediate connecting links each having spaced openings, pivot rods extending through said openings to connect said links in chain, a plurality of filler grate bars each having an open notch at one end whereby the filler bar is seated on one of said pivot rods to establish transverse rows in said grate, each said filler bar having a notch located between adjacent pivot rods and opening away from the fuel supporting surface of the filler bar and providing a ledge, a locking bar for each row having means adapted in one axially moved position of said bar to engage the ledges to hold the filler bars in chain and in another such position to be freed therefrom, said intermediate connecting links having holes to receive said locking bars, said end connecting links resting against the ends of said locking bars to prevent axial movement of said locking bars.

8. A furnace chain grate comprising end driving links each having spaced openings, pivot rods extending through the openings to connect said links in a chain, a plurality of filler grate bars each having a notch opening at one end whereby the filler bars are seated on said pivot rods between said driving links in transverse rows, each of said filler bars also having a notch providing a locking ledge, a locking bar for each row located between the said driving links and adapted to rest on the ledges of said filler bars whereby to hold the filler bars of said row, and means connected to said chain to hold said locking bar against bodily movement with respect to said pivot rods, said end driving links of each row engaging the bars to prevent endwise movement thereof.

9. A furnace chain grate comprising links and transverse pivot rods connecting the links in chain, removable fillers each having notches in one end whereby they may be placed in transverse rows upon said pivot rods and having a notch in the bottom intermediate the ends of the filler for providing a ledge on the respective filler, a locking bar for each row movable onto and off from the ledges of the fillers in the row, and means on the links for holding the bar in position on said ledges.

In witness whereof, I have hereunto signed my name this 8 day of January, 1925.

ALFRED WILLIAM BENNIS.